Figure 1:
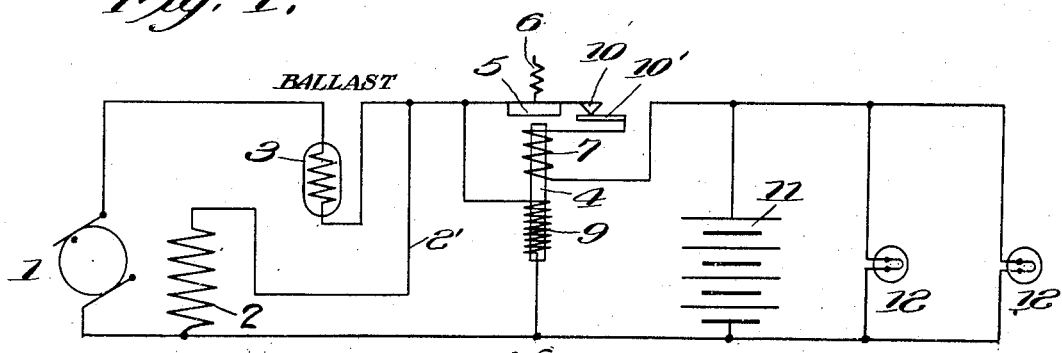

S. W. RUSHMORE.
ELECTRIC LIGHTING SYSTEM FOR VEHICLES.
APPLICATION FILED MAR. 8, 1911.

1,016,037.

Patented Jan. 30, 1912.

WITNESSES

INVENTOR
Samuel W. Rushmore
BY
Alfred Wilkinson
ATTORNEY

UNITED STATES PATENT OFFICE.

SAMUEL W. RUSHMORE, OF PLAINFIELD, NEW JERSEY.

ELECTRIC-LIGHTING SYSTEM FOR VEHICLES.

1,016,037.  Specification of Letters Patent.  Patented Jan. 30, 1912.

Application filed March 8, 1911. Serial No. 613,035.

*To all whom it may concern:*

Be it known that I, SAMUEL W. RUSHMORE, a citizen of the United States, residing at Plainfield, in the county of Union and State of New Jersey, have invented new and useful Improvements in Electric-Lighting Systems for Vehicles, of which the following is a specification.

My invention relates to the lighting of vehicles and consists in a new system and combination of parts, whereby incandescent electric lighting may be applied to automobiles and other vehicles, such as railway cars, where the necessary dynamo is driven from the propelling engine or car axle at widely varying rates of speed.

Electricity affords the ideal means for the lighting of automobiles and railway cars, for thereby is avoided the inconvenience of gas tanks, generators containing carbid and water, connecting pipes, etc.

As the dynamos for generating the current are connected to the propelling engine or geared to the axle, the speed of the dynamos and therefore the voltage and current generated vary over wide limits, so that, if no controlling device were applied, the lamps would be burned out or the storage battery, necessary on such vehicles, quickly destroyed. Where electric lighting systems are used on railway cars and supplied with current from a dynamo driven from the car axle, means such as supplementary dynamos, magnetically controlled regulators for cutting in and out resistances are used and may be used to overcome the difficulty, but such additional mechanism adds weight and complications and could not be used practically on automobiles. Even on railway cars such additional mechanism is inconvenient and complicated, involving a high cost of installation and maintenance, frequent repairs, etc.

My invention, broadly speaking, consists in the combination with the dynamo, the storage battery and the lamps, of a ballast coil made of iron, or other metal, having a high positive resistance temperature coefficient when heated, and in so arranging the various parts that the sudden rises in voltage and consequent rushes of current are opposed by the ballast coil more or less proportionately to such rises in voltage, and the fluctuations are absorbed by the battery. In other words, it consists in the employment with the dynamo of a ballast coil and a storage battery in such arrangement that initial and instantaneous protection of the lamps against excess of current is afforded by the battery, and a permanent protection of the battery, lamps and generator is afforded by the ballast.

My invention will be understood by reference to the drawings herewith in which—

Figure 2:
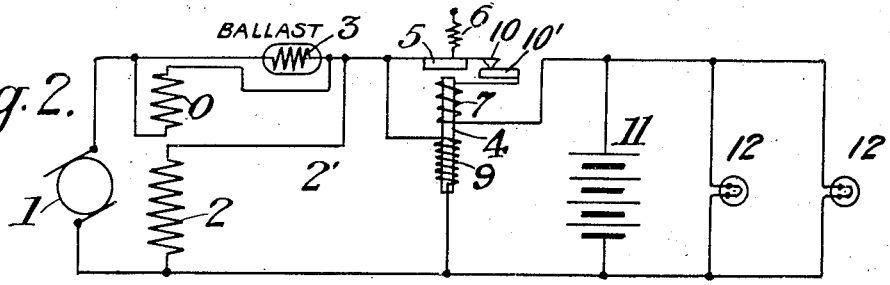
Figure 3:
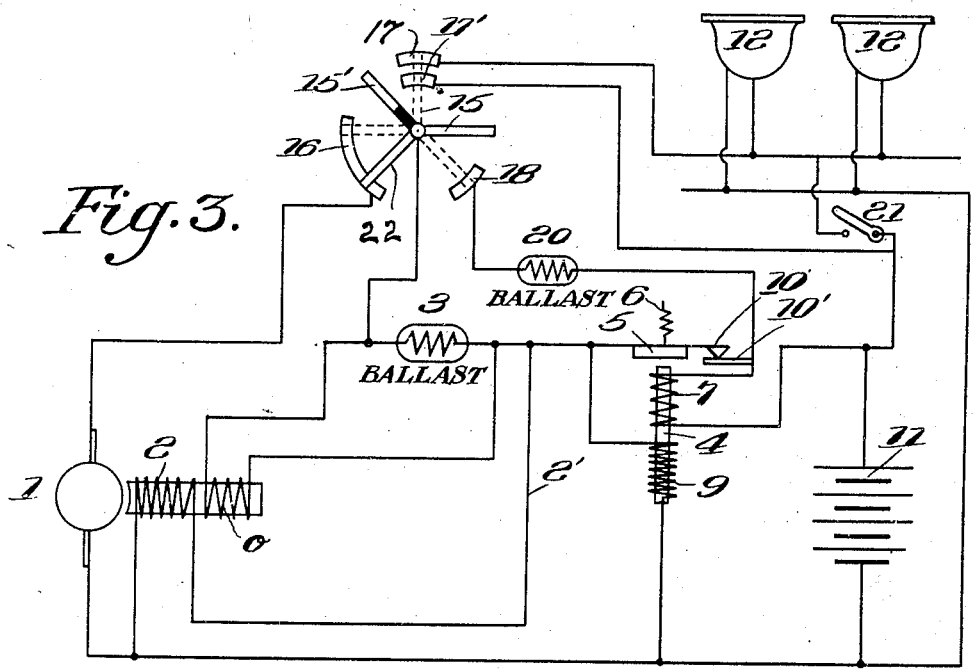

Figure 1 shows the invention in its simplest form as applied to the lighting of vehicles. Fig. 2 shows a preferred form with additional means for controlling the voltage of the dynamo and circuit output thereof. Fig. 3 shows an auxiliary ballast together with a suitable switching device for connecting the auxiliary ballast in shunt with the main ballast when the incandescent lamps are connected in parallel with the battery.

In Fig. 1, 1 is the armature of the dynamo having a shunt field coil 2, 3 is the ballast coil of iron wire (or other suitable material) having a high positive resistance temperature coefficient when heated, and preferably inclosed in a glass globe containing hydrogen or other non-oxidizing gas, 4 is a cut-out magnet having an armature 5 with a retractile spring 6 and wound with a shunt coil 9 and a series coil 7 connected in opposition to the shunt coil. 10—10' are contacts actuated by the armature 5 adapted to close the circuit from the dynamo armature 1 and through the ballast 3 and the cut-out coil 7, to a storage battery 11 and incandescent lamps 12 12.

The operation is as follows: The dynamo-armature 1 being brought up to normal speed a small current at first flows through the ballast 3, through connection 2' and through the dynamo field-coil 2. As the voltage builds up in the dynamo the current through the fine shunt coil 9 of the cut-out magnet 4, will also build up, energizing the cut-out magnet and causing the armature 5 to close the contacts 10—10', thus completing the circuit to the battery and lamps and placing the battery and lamps in parallel with each other and in series with the ballast and armature. The windings of the dynamo armature and of the iron ballast coil are so proportioned that, at normal speed of the engine or axle from which the armature is driven, the current, that will pass from the armature to the battery and lamps, will not be sufficient to heat the iron ballast wire to such a degree as to largely increase its resistance and therefore there will be but little energy loss in the ballast. When, however, the speed of the armature is increased above its normal speed, the voltage generated will rise and the current through the ballast will increase, thus rapidly raising the temperature of the iron wire and likewise its resistance, until, at the "critical point," a very slight increase in current will cause such a disproportionate increase in the resistance of the ballast that the current allowed to pass from the dynamo to the battery and lamps will remain practically constant, even though the speed and likewise the voltage of the dynamo should rise to several times the normal value. The dynamo shunt coil being connected at a point beyond the ballast will receive current at the voltage of the battery so long as the current flows from the dynamo to the battery, and therefore the normal excitation of the dynamo will remain practically constant and the voltage generated by the dynamo can not increase at a rate greater than the increase in the speed of the dynamo armature. In practice, owing to armature resistance and reaction, the rise in voltage when the dynamo is delivering current will be considerably less than the rise in the speed. When the speed of the dynamo falls so that the voltage generated is less than the voltage of the battery, a current will flow from the battery through the series cut-out coil 7, thence through the ballast and dynamo-armature, and being then opposed to the shunt coil 9 of the cut-out magnet, will cause the armature 5 to be released thus disconnecting the battery from the dynamo.

In the modified form of the invention shown in Fig. 2, 1 is the armature of the dynamo machine, having a main shunt field winding 2, and an auxiliary field winding o, wound in opposition to the shunt field winding 2. 3 is the ballast above described and connected in series with the armature and the load circuit as before. The auxiliary opposing field winding o is connected in parallel with the ballast 3. 4 is the cut-out as in Fig. 1, with the shunt coil 9, and the series coil 7 wound in opposition to the shunt coil, and having the armature 5 provided with a spring 6 adapted to close the contacts 10—10'. 11 is the storage battery and 12—12 are the incandescent lamps adapted to be connected in parallel with the armature circuit through the ballast 3.

The operation is as follows: When the armature 1 of the dynamo machine is brought up to normal speed, the currents through the main shunt field 2 and through the shunt coil 9 of the cut-out magnet 4 gradually build up causing the armature 5 to close the contacts 10—10', thus completing the circuit from the dynamo armature through the ballast to the battery and lamps, in the same manner as already described for the operation of the simpler form of the device illustrated in Fig. 1. The iron wire ballast is so proportioned that at normal speed of the dynamo armature, the current that will pass from the armature to the battery and lamps will not be sufficient to heat the iron wire ballast to such a degree as to largely increase its resistance, and therefore there will be but little energy loss in the ballast. When, however, the speed of the armature is increased above its normal speed, the voltage generated will rise and the current through the ballast will increase, thus rapidly raising the temperature of the ballast and likewise its resistance until its critical temperature is reached when a comparatively small further increase in current will cause a very large and disproportionate increase in the resistance of the ballast; the voltage drop across the terminals of the ballast will therefore also rise rapidly, causing a comparatively large current to flow through the auxiliary opposing field coil and exerting a demagnetizing effect on the field and counteracting the effect of the increased speed. Thus for a given output from the dynamo, the energy loss in the ballast will be less with the auxiliary field coil in action than with the main shunt field coil 2 alone in action. Heretofore field windings have been in opposition to the shunt windings of car lighting dynamos, usually series coils carrying the load current, but the opposing magnetizing action of such coils has been only in proportion to the load current or output of the dynamo.

In the form of my invention illustrated in Fig. 2, the current passing through the auxiliary field opposing coil is not in proportion to the main current but rises very rapidly as the speed of the dynamo increases above normal, owing to the abnormally high positive temperature coefficient of the ballast when heated to its critical temperature, and the consequent rapid rise of voltage across its terminals.

In Fig. 3 is shown the same arrangement of dynamo, storage battery and lamp circuits as in Fig. 2, with the addition of an auxiliary ballast 20, and a three-arm switch 15 whereby the auxiliary ballast can when desired be connected in parallel with the main ballast 3 when the lamps are switched into circuit. 21 is a switch adapted to connect the lamps in parallel with the battery. The main ballast 3 is so proportioned that when the battery alone is connected in the circuit without the lamps, as for example when running in the day time when no lamps are needed, the main ballast 3 would be heated to its critical temperature by a current somewhat above the normal charging current for the battery. This is the connection with the switch arm 22 in the position shown in Fig. 3. On closing the switch 21 and moving the switch 15 to the position shown in the dotted lines, the insulated finger 15' will connect the contact 17—17' together throwing the lamps 12—12 in parallel with the battery 11, and the finger 15 connecting with the contact 18 will simultaneously connect the auxiliary ballast 20 in parallel with the main ballast. In this arrangement the current from the dynamo divides between the main and auxiliary ballast in its path to the battery and lamps. The auxiliary and main ballasts are so proportioned that when the current flowing to the battery and lamps through both of the ballasts in parallel is greater than normal current due to the armature speed increasing above normal both ballasts will be heated to their critical temperature, this largely and disproportionately increasing their resistance and the voltage drop across their terminals, with the result of directly throttling the voltage and current delivered to the battery and lamps, and of forcing a relatively large current through the auxiliary field opposing coil o. The dynamo winding may be so proportioned to the requirements of the incandescent lamps that when all the lights are burning and both main and auxiliary ballasts are in the circuit the dynamo will supply at maximum running speed all of the current required by the lamps, while any excess will go to the battery.

In the case of lighting of railway cars any one of the well known devices or "pole changers" may be employed to reverse the connections from dynamo armature when the rotation of our axle is reversed. I am aware that it has been proposed to use ballast coils in series with individual incandescent lamps for the purpose of limiting the current. Commercially such systems are objectionable on account of complication and expense, and the practical impossibility of adjusting each individual lamp to its ballast, with the inevitable result that where the capacity of the lamp was below that of the ballast the lamp would be destroyed or vice versa the ballast would be destroyed. With a single ballast for a group of lamps, evidently there could be no variation in the number of lamps, and even aside from that, the range within which the ballast can control the current is too wide, without the aid of a battery to compensate for the fluctuations. I have avoided all these foregoing objection to the use of variable speed dynamos and by my combination and arrangement of the various parts have produced an electric lighting system particularly adapted for vehicles, in which also the simplest, most inexpensive, compact and economical dynamo can be used.

Having described my invention, I claim,

1. In a system of electric lighting by means of a dynamo driven at varying speed, the combination with the dynamo of a storage battery, a circuit of lamps arranged in parallel with the battery, a ballast in series with the dynamo armature and the battery and a shunt coil upon the dynamo having one terminal connected to one terminal of the dynamo and the other terminal connected at a point beyond the ballast, so that excitation of the dynamo shall remain practically constant although the voltage generated by same may vary.

2. A system of electric lighting, comprising a variable speed dynamo, a storage battery, a circuit of lamps, a plurality of means in series with the dynamo and the battery for absorbing, at the maximum speed of said dynamo, the energy in excess of that required to charge the battery and to operate the lamps, means for varying the number of said absorbing means and a shunt coil upon the dynamo having one terminal connected to one terminal of the dynamo and the other terminal connected at a point beyond the absorbing means.

3. A system of electric lighting comprising a variable speed dynamo, a storage battery, a main ballast in series with the dynamo and battery, an auxiliary ballast, a lighting circuit, a switching device adapted to connect the lighting system to the battery and to connect the auxiliary ballast in parallel with the main ballast and a shunt coil on the dynamo having one terminal connected to one terminal of the dynamo and the other terminal connected at a point beyond the two ballasts.

4. In a system for supplying electric lights from a dynamo generator driven at varying speed, a dynamo generator having a shunt field coil and an auxiliary field coil adapted to oppose the shunt coil, a storage battery, a circuit of lamps arranged in parallel with the battery, a ballast in series with the dynamo and with the battery, said shunt field coil having one terminal connected to one terminal of the dynamo and the other terminal connected beyond the ballast, and connections placing the auxiliary coil in parallel with the ballast so that as current through the ballast is increased the current through the auxiliary coil will be increased to oppose the magnetizing effect of the current in the shunt coil.

5. In an electrical system, a dynamo driven at varying speed having a shunt field coil and an auxiliary field coil adapted to oppose the shunt field coil, a supply circuit, a ballast in series with the dynamo and supply circuit, and connections placing the auxiliary field coil in shunt with the ballast, so that, as current through the ballast increases, the current through the auxiliary field coil will be increased to oppose the current in the main shunt field coil.

6. In a system for supplying electric lights from a dynamo generator driven at varying speed, a dynamo generator having a main shunt field coil and an auxiliary field coil adapted to oppose the main shunt field coil, a storage battery, a circuit of lamps arranged in parallel with the battery, a ballast in series with the dynamo and with the battery and connections placing the auxiliary field coil in parallel with the ballast so that as current through the ballast is increased the current through the auxiliary field coil will be increased to oppose the magnetizing effect of the current in the main shunt field coil.

7. In a system of electric lighting by means of a variable speed dynamo, a storage battery, a main ballast in series with the dynamo and an auxiliary ballast adapted be connected in parallel with the main ballast.

8. In a system of electric lighting the combination with the dynamo driven at varying speed, of a storage battery, a main ballast in series with the dynamo and battery, an auxiliary ballast, a lighting circuit and a switching device adapted to connect the lighting system to the battery and to connect the auxiliary ballast in parallel with the main ballast.

In testimony whereof I have signed my name to this specification in the presence of two subscribing witnesses.

SAMUEL W. RUSHMORE.

Witnesses:
J. R. MILLWARD,
M. L. BRESLIN.